United States Patent
Chen et al.

(10) Patent No.: US 10,027,549 B2
(45) Date of Patent: Jul. 17, 2018

(54) METHOD AND APPARATUS FOR DISPLAYING ROUTER SETUP INTERFACE

(71) Applicant: Xiaomi Inc., Beijing (CN)

(72) Inventors: Yong Chen, Beijing (CN); Qiuzhi Huang, Beijing (CN); Yidong Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 88 days.

(21) Appl. No.: 15/187,326

(22) Filed: Jun. 20, 2016

(65) Prior Publication Data

US 2016/0308716 A1    Oct. 20, 2016

Related U.S. Application Data

(63) Continuation of application No. PCT/CN2015/093859, filed on Nov. 5, 2015.

(30) Foreign Application Priority Data

Dec. 1, 2014 (CN) .......................... 2014 1 0715523

(51) Int. Cl.
*H04L 1/00* (2006.01)
*H04L 12/24* (2006.01)
*H04W 24/02* (2009.01)
*H04W 84/12* (2009.01)
*H04W 88/08* (2009.01)

(52) U.S. Cl.
CPC ......... *H04L 41/0853* (2013.01); *H04W 24/02* (2013.01); *H04W 84/12* (2013.01); *H04W 88/08* (2013.01)

(58) Field of Classification Search
CPC ....... H04L 41/04; H04L 41/085; H04L 41/12; H04L 45/02; H04L 41/0853; H04L 43/12;
(Continued)

(56) References Cited

U.S. PATENT DOCUMENTS 7,031,266 B1    4/2006  Patel et al.
8,069,230 B2   11/2011  Lancaster et al.
(Continued)

FOREIGN PATENT DOCUMENTS

CN    101420348 A    4/2009
CN    102685210 A    9/2012
(Continued)

OTHER PUBLICATIONS

International Search Report of PCT Application No. PCT/CN2015/093859 dated Feb. 16, 2016 (4 pages).
(Continued)

*Primary Examiner* — Dady Chery
(74) *Attorney, Agent, or Firm* — Finnegan, Henderson, Farabow, Garrett & Dunner LLP

(57) ABSTRACT

There is provided a method for displaying a router setup interface. The method is performed by a terminal and includes: receiving broadcast information from a wireless router; acquiring configuration parameters contained in the broadcast information; determining, based on the configuration parameters, whether an initialization setup of the wireless router is completed; if it is determined that the initialization setup of the wireless router is not completed, establishing a connection with the wireless router; acquiring a setup interface of the wireless router through the connection; and displaying the setup interface.

14 Claims, 11 Drawing Sheets

(58) Field of Classification Search
CPC ... H04L 45/04; H04L 12/66; H04L 29/08108; H04W 84/18; H04W 84/06; H04B 7/18528; H04B 7/18571; H04B 7/18576; H04N 21/436
USPC ........ 370/254, 255, 328, 463; 709/220, 221, 709/228, 250
See application file for complete search history.

(56) References Cited

U.S. PATENT DOCUMENTS

| | | | |
|---|---|---|---|
| 8,705,408 | B2 | 4/2014 | Low et al. |
| 2005/0198234 | A1 | 9/2005 | Leib et al. |
| 2013/0064132 | A1* | 3/2013 | Low ..................... H04W 24/02 370/254 |

FOREIGN PATENT DOCUMENTS

| | | |
|---|---|---|
| CN | 103702399 A | 4/2014 |
| CN | 103716811 A | 4/2014 |
| CN | 103873359 A | 6/2014 |
| CN | 104506443 A | 4/2015 |
| KR | 10-2013-0015135 A | 2/2013 |
| KR | 10-2013-0029237 A | 3/2013 |
| KR | 10-1733582 B1 | 5/2017 |
| RU | 2467380 C2 | 11/2012 |
| WO | WO 2009/064889 A2 | 5/2009 |

OTHER PUBLICATIONS

Russian Office Action for Russian Patent Application No. 2016111676/08 dated May 23, 2017.
English translation of International Search Report for International Application No. PCT/CN2015/093859, dated Feb. 16, 2016.
"Set with smart phone only, select a wireless LAN router for now, Try AOSS2 and QR code settings," http://internet.im press.co.jp/docs/special/554112.html, dated Aug. 24, 2012.
"Wi-Fi Simple Configuration Technical Specification", Version 2.0.2, 2011 Wi-Fi Alliance.
"Wi-Fi Simple Configuration Technical Specification", Version 2.0.5, 2014 Wi-Fi Alliance.

* cited by examiner

METHOD AND APPARATUS FOR DISPLAYING ROUTER SETUP INTERFACE

CROSS-REFERENCE TO RELATED APPLICATIONS

This application is a Continuation of International Application No. PCT/CN2015/093859 filed on Nov. 5, 2015, which is based upon and claims priority to Chinese Patent Application No. 201410715523.4, filed on Dec. 1, 2014, the entire contents of all of which are incorporated herein by reference.

TECHNICAL FIELD

The present disclosure relates to the field of wireless communication, and more particularly, to a method and an apparatus for displaying a router setup interface.

BACKGROUND

A wireless router is a communication device that can connect a wired network with a wireless network, and be used to establish a wireless local area network in which signals are transmitted and received wirelessly. After being turned on for the first time or restored to factory settings, the wireless router generally needs an initialization setup before it can provide normal network services.

An example of a user initializing the wireless router through a smart phone is described below. In the related art, after a wireless router is installed and turned on, the user employs his/her smart phone to scan neighboring wireless networks to find available access points, and is provided with a list of access pints, e.g., wireless routers. The user then selects one of the wireless routers on the wireless access-point list obtained through the scanning. After a successful access, the user opens a browser in the smart phone, and inputs a device address of the router. According to the device address, the browser acquires a setup interface from the selected wireless router and displays the setup interface, so that the user can perform, in the setup interface, initialization setup on the wireless router.

SUMMARY

According to a first aspect of the present disclosure, there is provided a method for displaying a router setup interface. The method is performed by a terminal and includes: receiving broadcast information from a wireless router; acquiring configuration parameters contained in the broadcast information; determining, based on the configuration parameters, whether an initialization setup of the wireless router is completed; if it is determined that the initialization setup of the wireless router is not completed, establishing a connection with the wireless router; acquiring a setup interface of the wireless router through the connection; and displaying the setup interface.

According to another aspect of the present disclosure, there is provided a method for displaying a router setup interface. The method is performed by a wireless router and includes: determining an initialization state of the wireless router; setting, based on the initialization state, configuration parameters in broadcast information to be transmitted; and transmitting the broadcast information including the configuration parameters. The broadcast information is used to instruct a terminal to: establish a connection with the wireless router when the terminal determines, based on the configuration parameters, that an initialization setup of the wireless router is not completed, acquire a setup interface of the wireless router through the connection, and display the setup interface.

According to another aspect of the present disclosure, there is provided a terminal for displaying a router setup interface. The terminal includes: one or more processors; and a memory. The one or more processors are configured to perform: receiving broadcast information from a wireless router; acquiring configuration parameters contained in the broadcast information; determining, based on the configuration parameters, whether an initialization setup of the wireless router is completed; if it is determined that the initialization setup of the wireless router is not completed, establishing a connection with the wireless router; acquiring a setup interface of the wireless router through the connection; and displaying the setup interface.

According to another aspect of the present disclosure, there is provided a router for displaying a router setup interface. The router includes: one or more processors; and a memory. The one or more processors are configured to perform: determining an initialization state of the wireless router; setting, based on the initialization state, configuration parameters in broadcast information to be transmitted; and transmitting the broadcast information including the configuration parameters. The broadcast information is used to instruct a terminal to: establish a connection with the wireless router when the terminal determines, based on the configuration parameters, that an initialization setup of the wireless router is not completed, acquire a setup interface of the wireless router through the connection, and display the setup interface.

According to another aspect of the present disclosure, there is provided a non-transitory computer-readable storage medium having stored therein instructions that, when executed by one or more processors of a terminal, cause the terminal to perform: receiving broadcast information from a wireless router; acquiring configuration parameters contained in the broadcast information; determining, based on the configuration parameters, whether an initialization setup of the wireless router is completed; if it is determined that the initialization setup of the wireless router is not completed, establishing a connection with the wireless router; acquiring a setup interface of the wireless router through the connection; and displaying the setup interface.

According to another aspect of the present disclosure, there is provided a non-transitory computer-readable storage medium having stored therein instructions that, when executed by one or more processors of a wireless router, cause the wireless router to perform: determining an initialization state of the wireless router; setting, based on the initialization state, configuration parameters in broadcast information to be transmitted; and transmitting the broadcast information including the configuration parameters. The broadcast information is used to instruct a terminal to: establish a connection with the wireless router when the terminal determines, based on the configuration parameters, that an initialization setup of the wireless router is not completed, acquire a setup interface of the wireless router through the connection, and display the setup interface.

It shall be appreciated that the above general description and the detailed description hereinafter are only illustrative and interpretative, but not for limiting the present disclosure.

BRIEF DESCRIPTION OF THE DRAWINGS

The accompanying drawings herein, which are incorporated into and constitute a part of the specification, illustrate embodiments consistent with the present disclosure, and together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
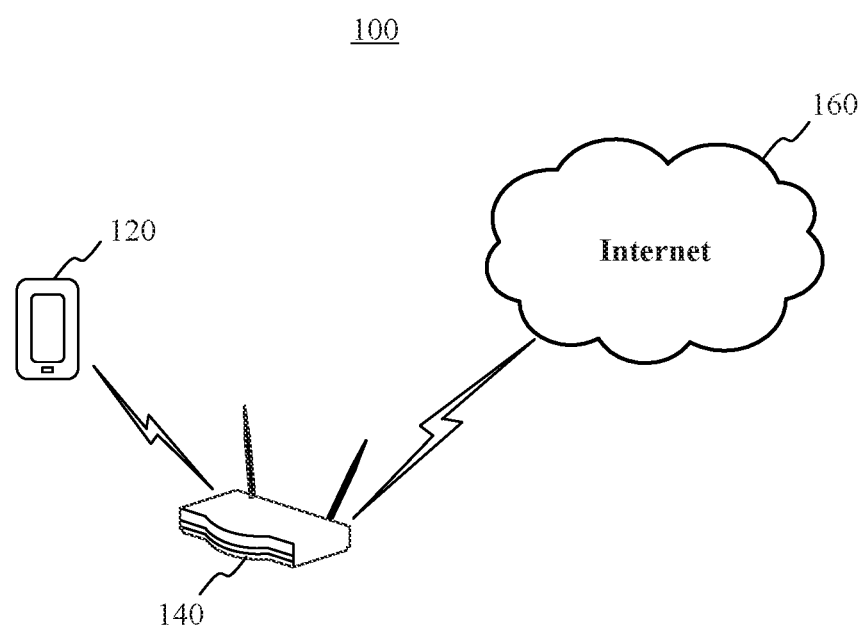
FIG. 1 illustrates a system for displaying a router setup interface consistent with embodiments of the present disclosure

FIG. 1 illustrates a system 100 for displaying a router setup interface consistent with embodiments of the present disclosure. The system 100 includes a terminal 120 and a wireless router 140 that is coupled to an Internet 160.

The terminal 120 may be a smart terminal, such as a smart phone, a tablet computer, an e-book reader, or a notebook computer, which have a wireless network accessing function. The wireless router 140 may access the internet 160. A short range wireless connection, such as Wi-Fi (Wi-Fi) connection, may be established between the terminal 120 and the wireless router 140.

Figure 2:
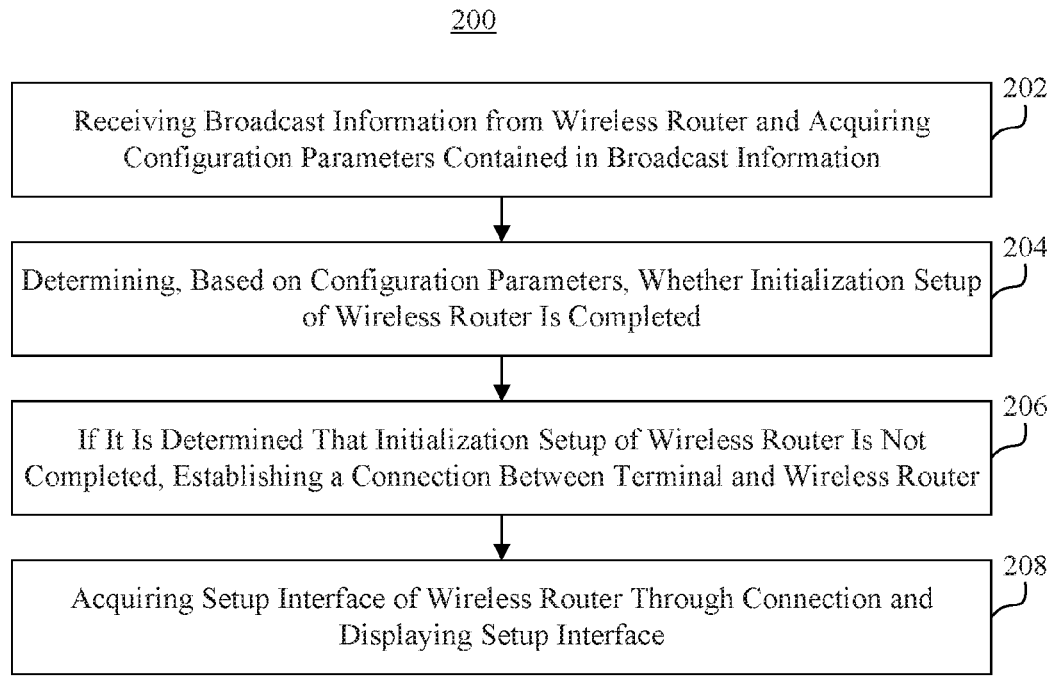
FIG. 2 is a flowchart illustrating a method for displaying a router setup interface according to an exemplary embodiment.

FIG. 2 is a flowchart illustrating a method 200 for displaying a router setup interface according to an exemplary embodiment. The method 200 for displaying a router setup interface may be performed by a terminal, such as the terminal 120 shown in FIG. 1. Referring to FIG. 2, the method 200 may include the following steps.

In step 202, the terminal 120 receives broadcast information from a wireless router, such as the router 140 shown in FIG. 1, and acquires configuration parameters contained in the broadcast information.

In step 204, the terminal 120 determines, based on the configuration parameters, whether initialization setup of the wireless router is completed.

In step 206, if it is determined that the initialization setup of the wireless router is not completed, the terminal 120 establishes a connection with the wireless router.

In step 208, the terminal 120 acquires a setup interface of the wireless router through the connection and displays the setup interface.

In some embodiments, the broadcast information contains a plurality of data blocks including a routing management block. Acquiring configuration parameters contained in the broadcast information may include acquiring a Wi-Fi simple configuration state identification from Wi-Fi simple configuration information of the routing management block. For example, the Wi-Fi simple configuration state identification may be defined according to a Wi-Fi Simple Configuration Specification.

In some embodiments, the step 204 includes reading an attribute value of the Wi-Fi simple configuration state identification.

If the attribute value of the Wi-Fi simple configuration state identification is, for example, 0x01, the terminal 120 determines that the initialization setup of the wireless router is not completed.

If the attribute value of the Wi-Fi simple configuration state identification is, for example, 0x02, the terminal 120 determines that the initialization setup of the wireless router is completed.

In some embodiments, prior to step 206, the method 200 further includes displaying prompt information allowing the user to determine whether to select and set the wireless router.

In some embodiments, the step 206 includes, when detecting that the user selects a wireless router to be set, establishing a connection between the terminal 120 and the wireless router 140.

Figure 3:
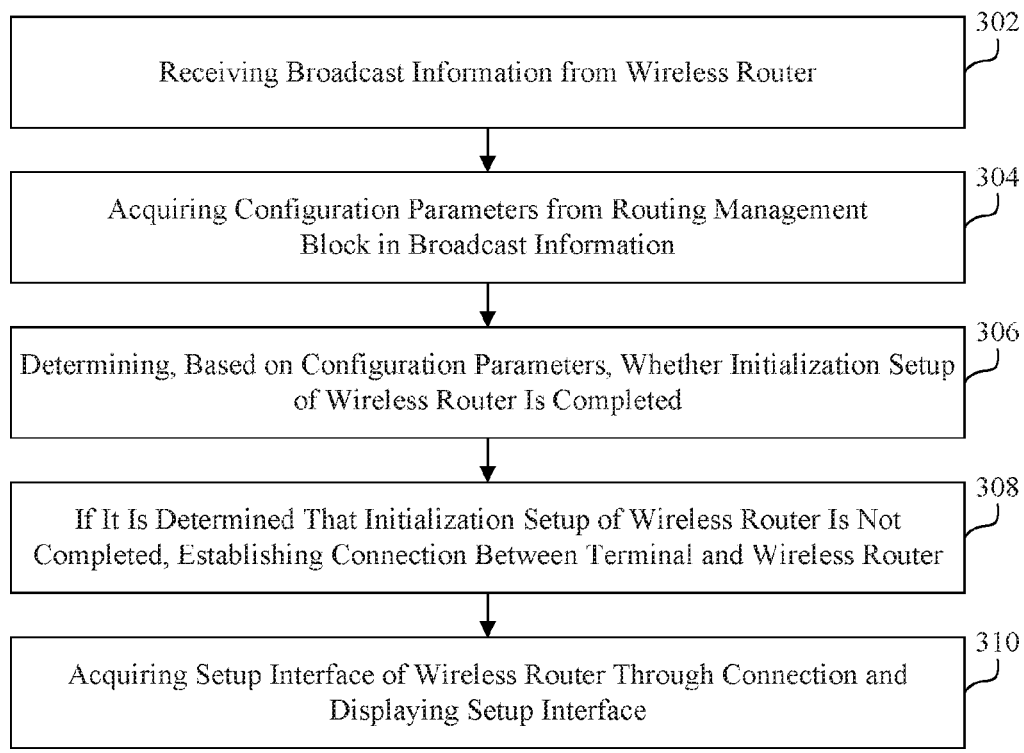
FIG. 3 is a flowchart illustrating a method for displaying a router setup interface according to another exemplary embodiment.

FIG. 3 is a flowchart illustrating a method 300 for displaying a router setup interface according to another exemplary embodiment. The method 300 may be performed by a terminal, such as the terminal 120 shown in FIG. 1. Referring to FIG. 3, the method 300 may include the following steps.

In step 302, the terminal 120 receives broadcast information from a wireless router.

In one embodiment, when a wireless router is turned on to operate, it periodically transmits broadcast information. The broadcast information may contain basic information of the wireless router, such as an SSID (Service Set Identifier) of the wireless router.

In step 304, the terminal 120 acquires configuration parameters from, for example, a routing management block of the broadcast information.

The broadcast information may contain a plurality of data blocks including a routing management block. After receiving the broadcast information, the terminal 120, such as a smart phone, may acquire configuration parameters of the wireless router from the routing management block in the broadcast information.

For example, the routing management block may include Wi-Fi simple configuration information. The terminal 120 may acquire a Wi-Fi simple configuration state identification in Wi-Fi simple configuration information.

In some embodiments, the configuration parameters may be provided not in the routing management block, but in a data block other than the routing management block in the broadcast information.

In step 306, the terminal 120 determines, based on the configuration parameters, whether initialization setup of the wireless router 140 is completed.

For example, the configuration parameters may include a Wi-Fi simple configuration state identification. If the initialization setup of the wireless router is not completed, an attribute value of the Wi-Fi simple configuration state identification can be set to, for example, 0x01; and if the initialization setup of the wireless router is completed, an attribute value of the Wi-Fi simple configuration state identification can be set to, for example, 0x02. After receiving the broadcast information, the terminal 120 may read the attribute value of the Wi-Fi simple configuration state identification. If the value of Wi-Fi simple configuration state identification is 0x01, it can be determined that the initialization setup of the wireless router is not completed.

In some embodiments, the configuration parameters are not limited to the Wi-Fi simple configuration state identification, but may be any other information that may be used to indicate whether the initialization setup of the wireless router is completed. The present disclosure is not limited to the above exemplary configuration parameters.

In step 308, if it is determined that the initialization setup of the wireless router is not completed, the terminal 120 establishes a connection with the wireless router.

For example, if the value of Wi-Fi simple configuration state identification in the broadcast information is 0x01, the terminal 120 may establish a connection with the wireless router.

For example, when the terminal 120 has not accessed another wireless access point, it may directly establish a connection with the wireless router. When the terminal 120 has accessed another wireless access point, it may switch the connection to the wireless router.

In step 310, the terminal 120 acquires a setup interface of the wireless router through the connection and displays the setup interface.

After establishing a connection with the wireless router, the terminal 120 may acquire a setup interface from the wireless router, and display the setup interface in a browser page, so that the user may perform, in the setup interface, initialization setup on the wireless router. The initialization setup may be, for example, setting a connection password, a web access manner, an encryption manner, a connection mode, etc.

Figure 4:
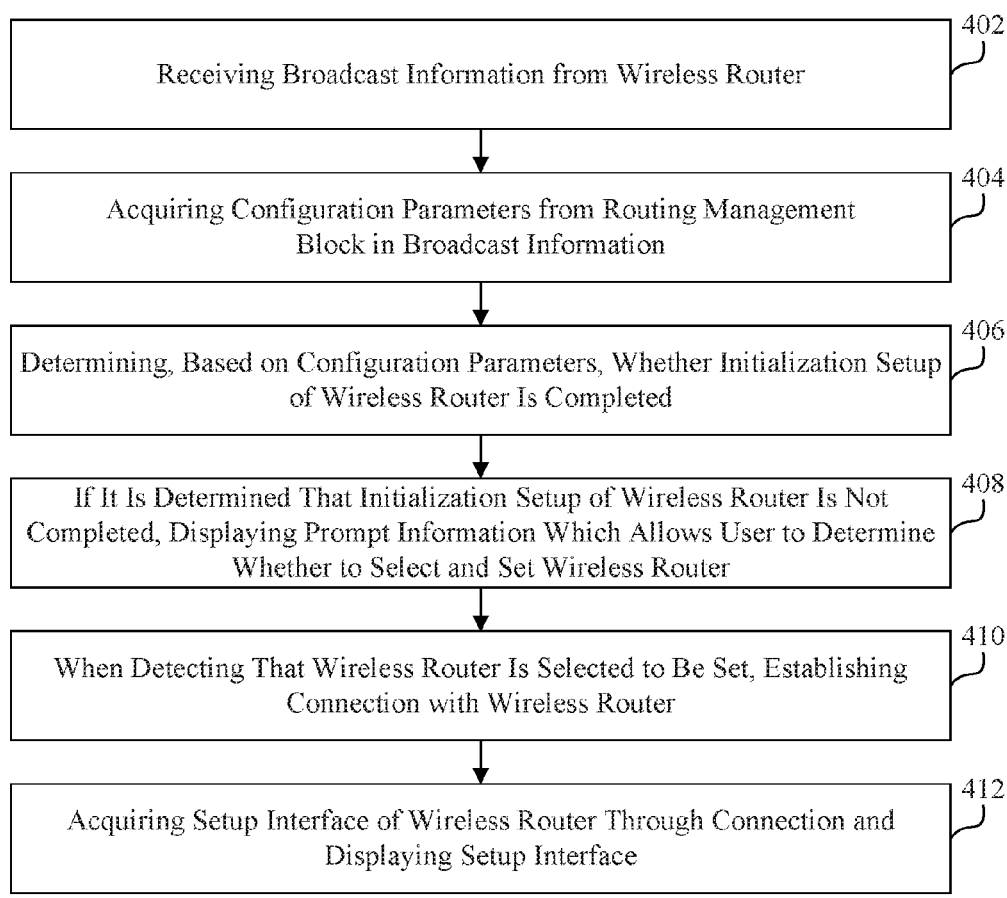
FIG. 4 is a flowchart illustrating a method for displaying a router setup interface according to still another exemplary embodiment.

FIG. 4 is a flowchart illustrating a method 400 for displaying a router setup interface according to still another exemplary embodiment. The method 400 may be performed by a terminal, such as the terminal 120 shown in FIG. 1. Referring to FIG. 4, the method 400 may include the following steps.

In step 402, the terminal 120 receives broadcast information from a wireless router.

In one embodiment, when a wireless router is turned on to operate, it periodically transmits broadcast information. The broadcast information may contain basic information of the wireless router, such as an SSID (Service Set Identifier) of the wireless router.

In step 404, the terminal 120 acquires configuration parameters from, for example, a routing management block of the broadcast information.

The broadcast information may contain a plurality of blocks of data, including a routing management block. After receiving the broadcast information, the terminal 120, such as a smart phone, may acquire configuration parameters from the routing management block in the broadcast information.

For example, the routing management block may include Wi-Fi simple configuration information. The terminal 120 may acquire a Wi-Fi simple configuration state identification in Wi-Fi simple configuration information.

In some embodiments, the configuration parameters may be provided not in the routing management block, but in a data block other than the routing management block in the broadcast information.

In step 406, the terminal 120 determines, based on the configuration parameters, whether initialization setup of the wireless router is completed.

For example, the configuration parameters may include a Wi-Fi simple configuration state identification. If the initialization setup of the wireless router setup is not completed, an attribute value of the Wi-Fi simple configuration state identification can be set as, for example, 0x01; and if the wireless router's initialization setup is completed, an attribute value of the Wi-Fi simple configuration state identification can be set as, for example, 0x02. After receiving the broadcast information, the terminal 120 may read the value of the Wi-Fi simple configuration state identification. If the value of Wi-Fi simple configuration state identification is 0x01, it can be determined that the initialization setup of the wireless router is not completed.

In some embodiments, the configuration parameters are not limited to the Wi-Fi simple configuration state identification, but may be any other information that may be used to indicate whether the initialization setup of the wireless router is completed. The present disclosure is not limited to the above exemplary configuration parameters.

In step 408, if the terminal determines that the initialization setup of the wireless router is not completed, it displays prompt information, allowing the user to determine whether to select and set the wireless router.

If the value of the Wi-Fi simple configuration state initialization in the broadcast information is 0x01, the terminal 120 displays a prompt box including prompt information, which allows the user to select whether to perform initialization setup on the wireless router.

In one embodiment, the terminal 120 can scan and detect that two or more wireless routers have not been initialized. The terminal 120 may display to the user in form of a list, the identifiers (e.g., SSIDs of wireless routers) of the two or more wireless routers for which the initialization setups have not been performed. The user may select one of the wireless routers to go through an initialization setup.

In step 410, when detecting that a wireless router is selected for initialization setup, the terminal 120 establishes a connection with the wireless router.

If the user selects to set up one of the wireless routers, the terminal 120 may establish a connection with the wireless router.

For example, when the terminal 120 has not accessed another wireless access point, it may directly establish a connection with the wireless router. When the terminal 120 has accessed another wireless access point, it may switch the connection to the wireless router.

In step 412, the terminal 120 acquires a setup interface of the wireless router through the connection and displays the setup interface.

After establishing a connection with the wireless router, the terminal 120 may acquire a setup interface from the wireless router, and display the setup interface in a browser page, so that the user may perform, in the setup interface, initialization setup on the wireless router. The initialization setup may be, for example, setting a connection password, a web access manner, an encryption manner, a connection mode, etc.

In some embodiments, the broadcast information transmitted from the wireless router further contains an address of the wireless router. The terminal 120 may extract the address from the broadcast information, and according to the address, acquire a setup interface from the wireless router, and display the setup interface.

Different types of wireless routers may have, for example, different administrator addresses. In the illustrated embodiment, the wireless router adds its own administrator address to the broadcast information. After receiving the broadcast information, and detecting that the initialization setup of the wireless router is not completed, the terminal 120 may acquire the setup interface of the wireless router according to the administrator address included in the broadcast information.

The broadcast information may also include model information of the wireless router. According to the model information of the wireless router, the terminal 120 may determine the administrator address of the wireless router, to acquire the setup interface according to the administrator address. In one embodiment, because the kinds of administrator address of the wireless router are relatively few, the terminal 120 may try the different administrator addresses one by one until it successfully acquires the setup interface. For example, common administrator addresses include 192.168.1.1 and 192.168.0.1. The terminal 120 may try these addresses one by one to acquire the setup interface from the wireless router.

Figure 5:
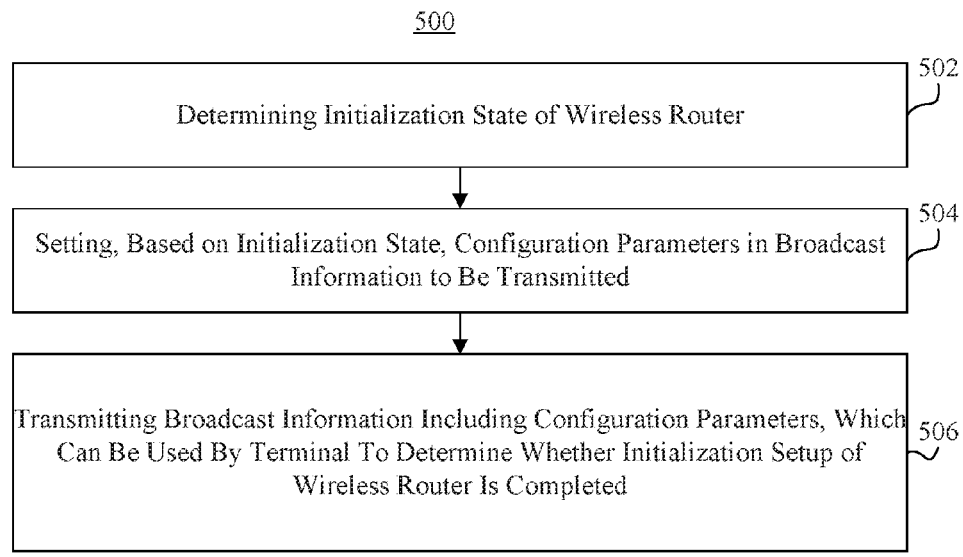
FIG. 5 is a flowchart illustrating a method for displaying a router setup interface according to an exemplary embodiment.

FIG. 5 is a flowchart illustrating a method 500 for displaying a router setup interface according to an exemplary embodiment. The method 500 may be performed by a wireless router, such as the wireless router 140 as shown in FIG. 1. Referring to FIG. 5, the method 500 may include the following steps.

In step 502, the wireless router 140 determines its initialization state. The initialization state indicates whether the initialization setup of the wireless router is completed.

In step 504, based on the initialization state, the wireless router 140 sets configuration parameters to be included in broadcast information.

In step 506, the wireless router 140 transmits the broadcast information including the configuration parameters. The broadcast information can be used by a terminal to determine whether the initialization setup of the wireless router is completed, as explained above. When the terminal determines, based on the configuration parameters, that the initialization setup of the wireless router is not completed, a connection between the terminal and the wireless router is established, so that the terminal may acquire a setup interface of the wireless router through the connection and display the setup interface.

Figure 6:
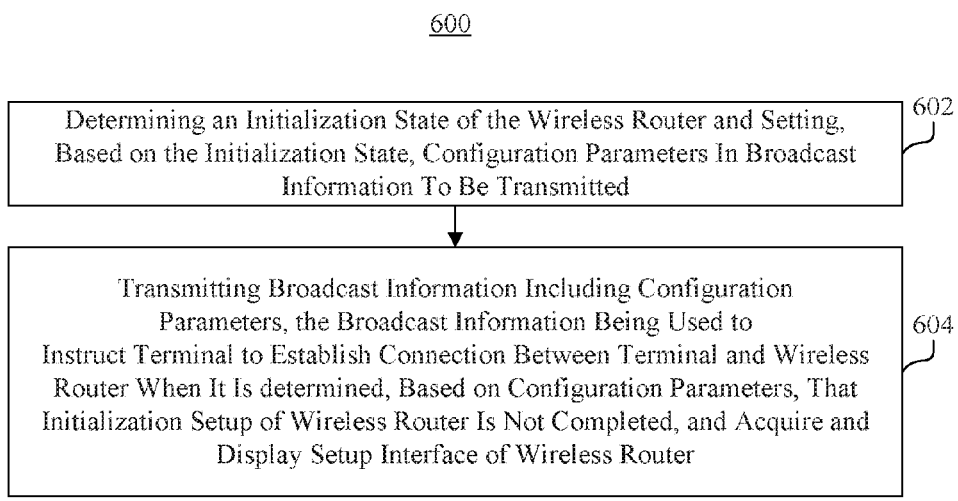
FIG. 6 is a flowchart illustrating a method for displaying a router setup interface according to another exemplary embodiment.

FIG. 6 is a flowchart illustrating a method 600 for displaying a router setup interface according to another exemplary embodiment. The method 600 may be performed by a wireless router, such as the wireless router 140 shown in FIG. 1. Referring to FIG. 6, the method 600 may include the following steps.

In step 602, the wireless router 140 determines its initialization state, and based on the initialization state, sets configuration parameters in broadcast information to be transmitted.

The broadcast information may contain a plurality of data blocks including a routing management block. The wireless router 140 may set configuration parameters in the routing management block. In some embodiments, the configuration parameters may be provided not in the routing management block, but in a data block other than the routing management block in the broadcast information.

In one embodiment, if the initialization setup of the wireless router is not completed, an attribute value of Wi-Fi simple configuration state identification in the routing management block can be set to, for example, 0x01. If the initialization setup of the wireless router is completed, an attribute value of the Wi-Fi simple configuration state identification in the routing management block can be set to for example, 0x02. That is, if the initialization setup of the wireless router is not completed, the wireless router sets the value for Wi-Fi simple configuration state identification to, e.g., 0x01; if the initialization setup of the wireless router is completed, the wireless router sets the value for Wi-Fi simple configuration state identification to, for example, 0x02.

In some embodiments, the configuration parameters are not limited to the Wi-Fi simple configuration state identification, but may be any other information that may be used to indicate whether the initialization setup of the wireless router is completed. The present disclosure is not limited to the above exemplary configuration parameters.

In step 604, the wireless router 140 transmits the broadcast information including the configuration parameters. The broadcast information is used to instruct a terminal to establish a connection between the terminal and the wireless router when it is determined, based on the configuration parameters, that the initialization setup of the wireless router is not completed, and acquire a setup interface of the wireless router through the connection, and display the setup interface.

After receiving the broadcast information, the terminal, such as a smart phone, may read the value of the Wi-Fi simple configuration state identification. If the value of the Wi-Fi simple configuration state identification is 0x01, it can be determined that the wireless router initialization is not completed.

In some embodiments, the wireless router may add an administrator address of the wireless router to the broadcast information. The terminal may extract the administrator address from the broadcast information, and according to the administrator address, acquire a setup interface from the wireless router, and display the setup interface.

Different types of wireless routers may have different administrator addresses. In the illustrated embodiment, the wireless router 140 adds its own administrator address to the broadcast information. After receiving the broadcast information, and detecting that the initialization setup of the wireless router is not completed, the terminal may acquire the setup interface of the wireless router according to the administrator address included in the broadcast information.

The broadcast information may also include model information of the wireless router 140. According to the model information of the wireless router, the terminal may determine the administrator address of the wireless router 140, to acquire the setup interface according to the administrator address.

Figure 7:
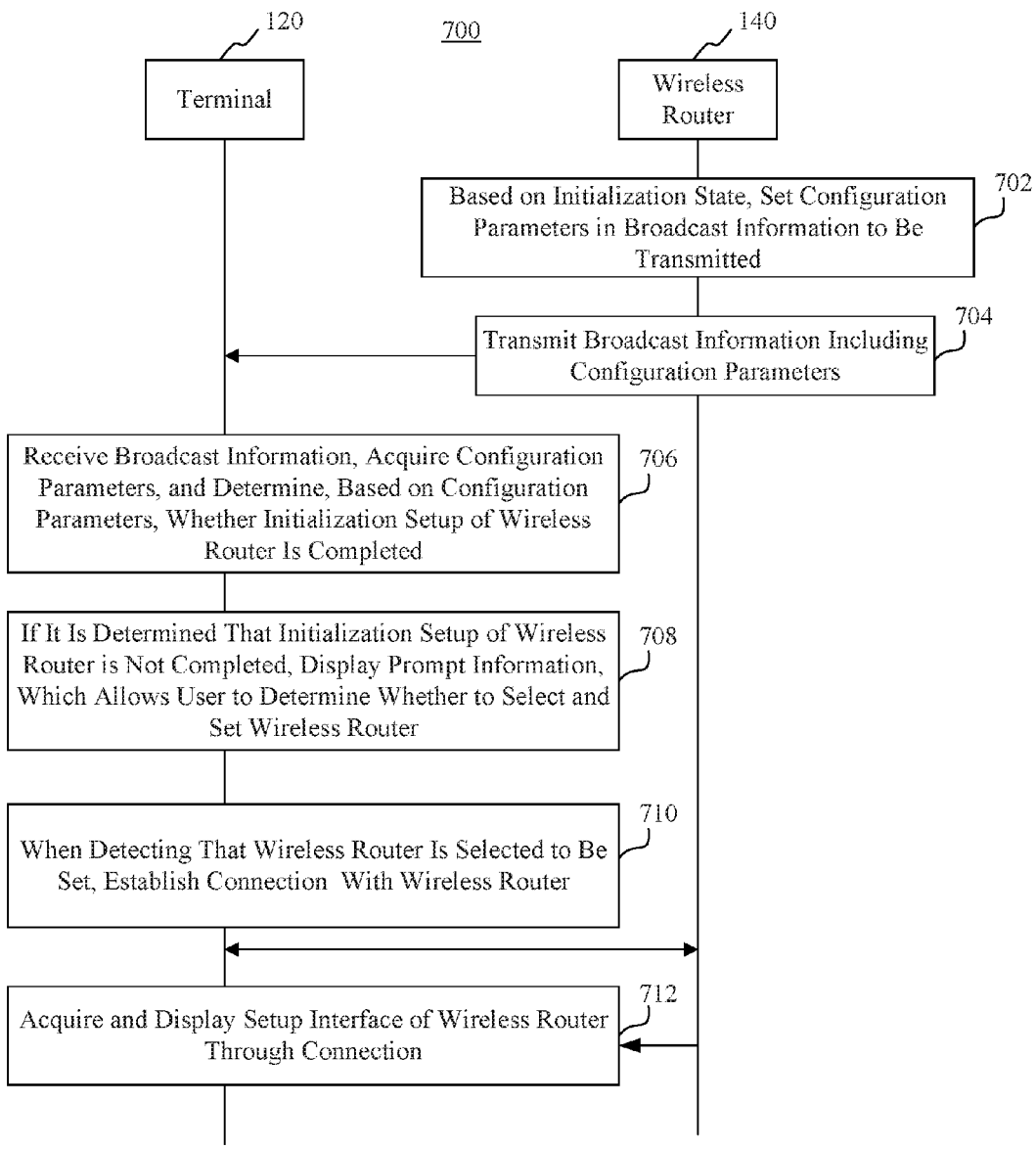
FIG. 7 is a flowchart illustrating a method for displaying a router setup interface according to an exemplary embodiment.

FIG. 7 is a flowchart illustrating a method 700 for displaying a router setup interface according to an exemplary embodiment. The method may be perform by, for example, the system 100 shown in FIG. 1. Referring to FIG. 7, the method 700 may include the following steps.

In step 702, based on its initialization state, the wireless router 140 sets configuration parameters in broadcast information to be transmitted.

When a wireless router 140 is turned on to operate, it periodically transmits the broadcast information. The broadcast information may contain basic information of the wireless router 140, such as an SSID of the wireless router.

The broadcast information contains a plurality of data blocks including a routing management block. In the illustrated embodiment, the wireless router 140 may set configuration parameters in the routing management block. In some embodiments, the configuration parameters may be provided not in the routing management block, but in a data block other than the routing management block in the broadcast information.

In some embodiments, the configuration parameters in the routing management block may include an attribute value for Wi-Fi simple configuration state identification. If the initialization setup of the wireless router is not completed, the wireless router 140 sets the value for Wi-Fi simple configuration state identification as, for example, 0x01; if the initialization setup of the wireless router is completed, the wireless router 140 sets the value for Wi-Fi simple configuration state identification as, for example, 0x02. In the illustrated embodiments, the value is not limited these two exemplary values and can be other value of type of value.

In some embodiments, the configuration parameters are not limited to the Wi-Fi simple configuration state identification, but may be any other information that may be used to indicate whether the initialization setup of the wireless router is completed. The present disclosure is not limited to the above exemplary configuration parameters.

In step 704, the wireless router 140 transmits the broadcast information including the configuration parameters.

In step 706, the terminal 120 receives the broadcast information, acquires the configuration parameters, and determines, based on the configuration parameters, whether the initialization setup of the wireless router is completed.

For example, after receiving the broadcast information, the terminal 120 may read the value of the Wi-Fi simple configuration state identification. If the value of Wi-Fi simple configuration state identification is 0x01, it can be determined that the initialization setup of the wireless router is not completed.

In step 708, if the terminal 120 determines that the initialization setup of the wireless router is not completed, it displays prompt information, allowing the user to determine whether to select and set the wireless router 140.

If the value of the Wi-Fi simple configuration state identification in the broadcast information is 0x01, the terminal 120 displays a prompt box including prompt information, which allows the user to select whether to perform initialization setup on the wireless router 140.

In one embodiment, the terminal 120 can scan and detect that two or more wireless routers have not been initialized. The terminal 120 may display the identifiers (e.g., SSIDs of wireless routers) of the two or more wireless routers for which the initialization setups have not been performed to the user in form of a list. The user may select one of the wireless routers to go through an initialization setup.

In step 710, if it is determined that the initialization setup of the wireless router is not completed, the terminal 120 establishes a connection with the wireless router 140.

If the user selects to set one of the wireless routers, the terminal 120 may establish a connection with the wireless router 140. For example, when the terminal 120 has not accessed other wireless access point, it may directly establish a connection with the wireless router 140. When the terminal 120 has accessed other wireless access point, it may switch the connection to the wireless router 140.

In step 712, the terminal 120 acquires a setup interface of the wireless router 140 through the connection and displays the setup interface.

After establishing a connection with the wireless router 140, the terminal 120 may acquire a setup interface from the wireless router 140, and display the setup interface in a browser page, so that the user may perform, in the setup interface, initialization setup on the wireless router 140. The initialization setup may be, for example, setting a connection password, a web access manner, an encryption manner, a connection mode, etc.

In some embodiments, the broadcast information transmitted from the wireless router 140 further contains an administrator address of the wireless router 140. The terminal 120 may extract the administrator address from the broadcast information, and according to the administrator address, acquire a setup interface from the wireless router 140, and display the setup interface.

Different types of wireless routers may have different administrator addresses. In the illustrated embodiment, the wireless router 140 adds its own administrator address to the broadcast information. After receiving the broadcast information, and detecting that the initialization setup of the wireless router setup is not completed, the terminal 120 may acquire the setup interface of the wireless router 140 according to the administrator back-end device address included in the broadcast information.

The broadcast information may also include model information of the wireless router 140. According to the model information of the wireless router 140, the terminal 120 may determine the administrator address of the wireless router 140, to acquire the setup interface according to the administrator address. In one embodiment, because the kinds of administrator address of the wireless router 140 are relatively few, the terminal 120 may try the different administrator addresses one by one until it successfully acquires the setup interface. For example, common administrator addresses include 192.168.1.1 and 192.168.0.1. The terminal 120 may try these addresses one by one to acquire the setup interface from the wireless router 140.

Consistent with embodiments of the present disclosure, the methods 200, 300, 400, 500, 600, and 700 for displaying a router setup interface explained above include steps for determining whether the initialization setup of the wireless router is completed, based on the configuration parameters contained in the broadcast information transmitted from the wireless router 140. If the initialization setup of the wireless router is not completed, the terminal 120 automatically establishes a connection with the wireless router 140 to acquire the setup interface from the wireless router 140, and displays the setup interface, thereby freeing the user from the need to perform operations of creating connection and to manually input the device address, which makes the operation process complicated. The methods performed by the user's terminal 120 may reduce user's involvement to set up a wireless router, thereby improving user experience.

The present disclosure also includes apparatuses for performing the above-described methods. The detailed functions of the apparatuses, if not disclosed below, may be referred to the steps of the methods.

Figure 8:
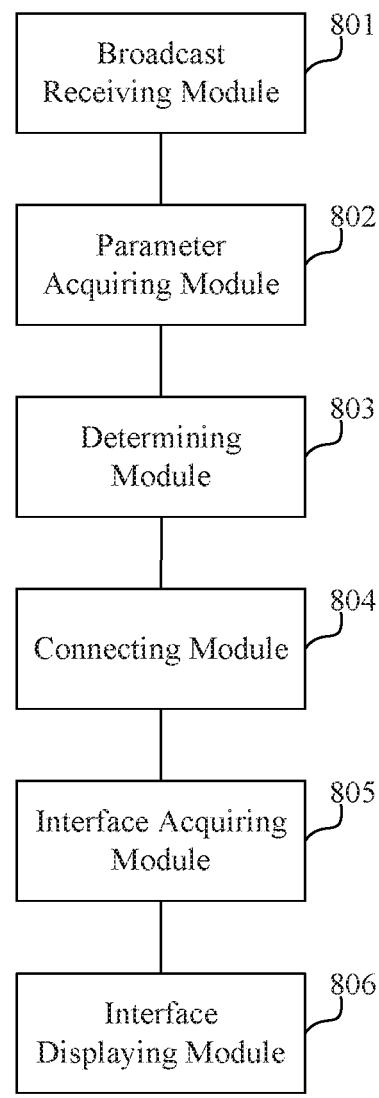
FIG. 8 is a block diagram of an apparatus for displaying a router setup interface according to an exemplary embodiment.

FIG. 8 is a block diagram of an apparatus 800 for displaying a router setup interface according to an exemplary embodiment. The apparatus 800 may be, for example, the terminal 120 shown in FIG. 1. As shown in FIG. 8, the apparatus 800 includes: a broadcast receiving module 801, a parameter acquiring module 802, a detecting module 803, a connecting module 804, an interface acquiring module 805, and an interface displaying module 806.

The broadcast receiving module 801 is configured to receive broadcast information from a wireless router.

The parameter acquiring module 802 is configured to acquire configuration parameters contained in the broadcast information.

The determining module 803 is configured to determine, based on the configuration parameters, whether the initialization setup of the wireless router is completed.

The connecting module 804 is configured to, if the determining module 803 determines that the initialization setup of the wireless router is not completed, establish a connection between the terminal and the wireless router.

The interface acquiring module 805 is configured to acquire a setup interface of the wireless router through the connection.

The interface displaying module 806 is configured to display the setup interface acquired by the interface acquiring module 805.

Figure 9:
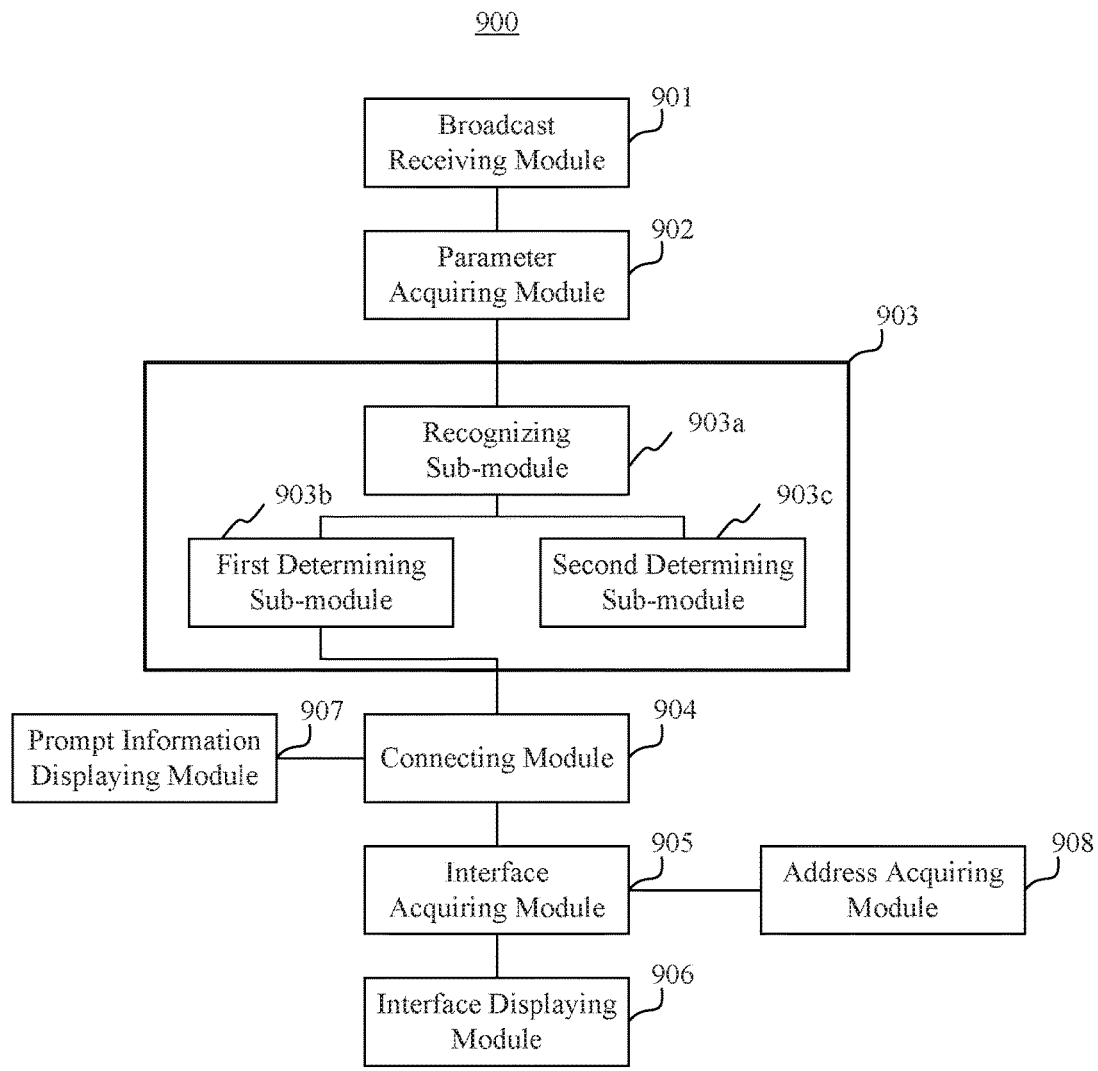
FIG. 9 is a block diagram of an apparatus for displaying a router setup interface according to another exemplary embodiment.

FIG. 9 is a block diagram of an apparatus 900 for displaying a router setup interface according to another exemplary embodiment. The apparatus 900 may be a terminal, such as the terminal 120 shown in FIG. 1. As shown in FIG. 9, the apparatus 900 includes: a broadcast receiving module 901, a parameter acquiring module 902, a determining module 903, a connecting module 904, an interface acquiring module 905, and an interface displaying module 906. The modules 901-906 are similar to the modules 801-806 shown in FIG. 8, respectively, and the details of their functions is omitted.

In some embodiments, the parameter acquiring module 902 is configured to acquire an attribute value of Wi-Fi simple configuration state identification in Wi-Fi simple configuration information of a routing management block, contained in the broadcast information.

In some embodiments, the determining module 903 includes: a recognizing sub-module 903a, a first determining sub-module 903b, and a second determining sub-module 903c.

The recognizing sub-module 903a is configured to read an attribute value of the Wi-Fi simple configuration state identification.

The first determining sub-module 903b is configured to, if the attribute value of the Wi-Fi simple configuration state identification is, e.g., 0x01, determine that the initialization setup of the wireless router is not completed.

The second determining submodule 903c is configured to, if the attribute value of the Wi-Fi simple configuration state identification is, e.g., 0x02, determine that the initialization setup of the wireless router is completed.

In some embodiments, the apparatus 900 further includes: a prompt information displaying module 907, configured to, prior to connecting the terminal 120 with the wireless router 140 by the connecting module 904, display prompt information, allowing the user to determine whether to select and set the wireless router 140.

In some embodiments, the connecting module 904 is configured to, when it is detected that the wireless router 140 is selected to go through a setup procedure, establish a connection between the terminal 120 and the wireless router 140.

In some embodiments, the apparatus 900 further includes: an address acquiring module 908, configured to acquire an administrator address of the wireless router 140 contained in the broadcast information.

The interface acquiring module 905 is configured to acquire a setup interface of the wireless router 140 according to the administrator address.

Figure 10:
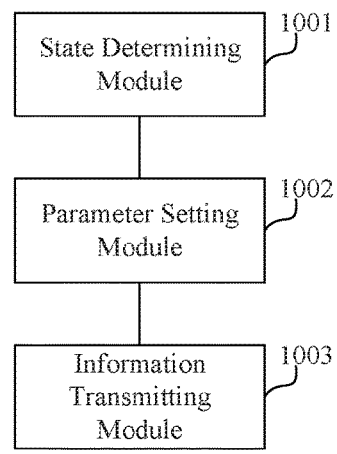
FIG. 10 is a block diagram of an apparatus for displaying a router setup interface according to an exemplary embodiment.

FIG. 10 is a block diagram of an apparatus 1000 for displaying a router setup interface according to an exemplary embodiment. The apparatus 1000 may be the wireless router 140 shown in FIG. 1. As shown in FIG. 10, the apparatus 1000 includes: a state determining module 1001, a parameter setting module 1002, and an information transmitting module 1003.

The state determining module 1001 is configured to determine an initialization state of the wireless router 140.

The parameter setting module 1002 is configured to set, based on the initialization state, configuration parameters in broadcast information to be transmitted.

The information transmitting module 1003 is configured to transmit the broadcast information which includes the configuration parameters. The broadcast information can be used by a terminal to determine whether the initialization setup of the wireless router is completed, as explained above. When the terminal determines, based on the configuration parameters, that the initialization setup of the wireless router is not completed, a connection between the terminal and the wireless router is established, so that the terminal may acquire a setup interface of the wireless router through the connection and display the setup interface.

Figure 11:
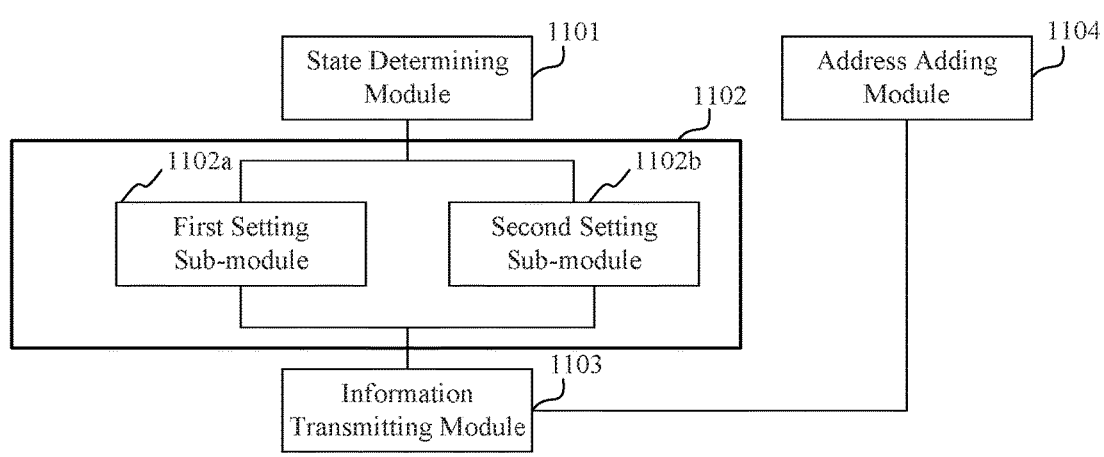
FIG. 11 is a block diagram of an apparatus for displaying a router setup interface according to another exemplary embodiment.

FIG. 11 is a block diagram of an apparatus 1100 for displaying a router setup interface according to an exemplary embodiment. The apparatus may be the wireless router 140 shown in FIG. 1. As shown in FIG. 11, the apparatus 1100 includes: a state determining module 1101, a parameter setting module 1102, and an information transmitting module 1103. The modules 1101-1103 are similar to the modules 1001-1003 shown in FIG. 10, respectively, and the details of their functions are omitted.

In some embodiments, the parameter setting module 1102 includes: a first setting sub-module 1102a and a second setting sub-module 1102b.

The first setting sub-module 1102a is configured to, if the initialization state of the wireless router 140 indicates that the initialization setup of the wireless router 140 is not completed, set an attribute value of a Wi-Fi simple configuration state identification in a routing management block to, e.g., 0x01. The broadcast information contains the routing management block.

The second setting sub-module 1002b is configured to, if the initialization state of the wireless router 140 indicates that the initialization setup of the wireless router 140 is completed, set the attribute value of a Wi-Fi simple configuration state identification in the routing management block to, e.g., 0x02.

In some embodiments, the apparatus 1100 further includes: an address adding module 1104, configured to add an administrator address of the wireless router 140 into the broadcast information to be transmitted.

Figure 12:
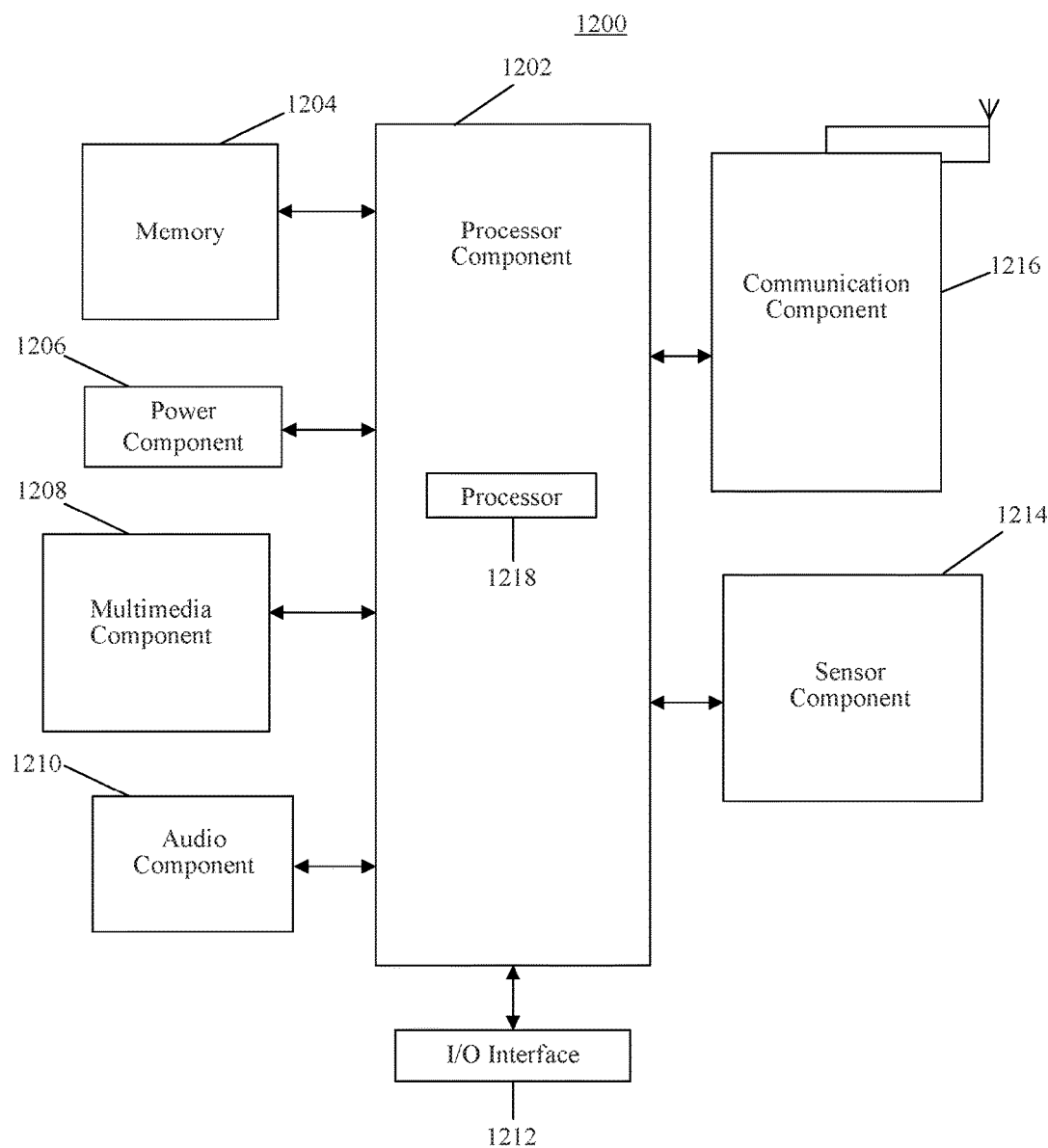
FIG. 12 is a block diagram of an apparatus for displaying a router setup interface according to an exemplary embodiment.

FIG. 12 is a block diagram of an apparatus 1200 for displaying a router setup interface according to an exemplary embodiment. For example, the apparatus 1200 may be the terminal 120 shown in FIG. 1, and can be a mobile phone, a computer, a digital broadcast terminal, a messaging device, a gaming console, a tablet, a medical device, exercise equipment, a personal digital assistant, and the like.

Referring to FIG. 12, the apparatus 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the apparatus 1200, such as the operations associated with display, telephone calls, data communications, camera operations, and recording operations. The processing component 1202 may include one or more processors 1218 to execute instructions to perform all or a part of the steps in the above-described methods. In addition, the processing component 1202 may include one or more modules which facilitate the interaction between the processing component 1202 and other components. For example, the processing component 1202 may include a multimedia module to facilitate the interaction between the multimedia component 1208 and the processing component 1202.

The memory 1204 is configured to store various types of data to support the operations of the apparatus 1200. Examples of such data include instructions for any application or method operated on the apparatus 1200, contact data, phonebook data, messages, pictures, videos, and the like. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk. The memory 1204 further stores one or more modules which are configured to be executed by the one or more processors 1220, to perform all or a part of the steps in the methods described above.

The power component 1206 provides power to various components of the apparatus 1200. The power component 1206 may include a power management system, one or more power supplies, and other components associated with the generation, management, and distribution of power in the apparatus 1200.

The multimedia component 1208 includes a screen providing an output interface between the apparatus 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and/or the rear camera may receive external multimedia data while the apparatus 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone (MIC) configured to receive an external audio signal when the apparatus 1200 is in an operation mode, such as a call mode, a recording mode, or a voice recognition mode. The received audio signal may be further stored in the memory 1204 or transmitted through the communication component 1216. In some embodiments, the audio component 1210 further includes a speaker to output audio signals.

The I/O interface 1212 provides an interface between the processing component 1202 and a peripheral interface module, such as a keyboard, a click wheel, a button, or the like. The buttons may include, but are not limited to, a home button, a volume button, a starting button, and a locking button.

The sensor component 1214 includes one or more sensors to provide status assessments of various aspects of the apparatus 1200. For example, the sensor component 1214 may detect an open/closed status of the apparatus 1200, relative positioning of components, e.g., the display and the keypad, of the apparatus 1200, a change in position of the apparatus 1200 or a component of the apparatus 1200, a presence or absence of user contact with the apparatus 1200, an orientation or an acceleration/deceleration of the apparatus 1200, and a change in temperature of the apparatus 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communications, wired or wirelessly, between the apparatus 1200 and other devices. The apparatus 1200 may access a wireless network based on a communication standard, such as WiFi, 2G, or 3G, or a combination thereof. In one exemplary embodiment, the communication component 1216 receives a broadcast signal or broadcast associated notification information from an external broadcast management system through a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as included in the memory 1204, executable by the processor 1218 in the apparatus 1200, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

Figure 13:
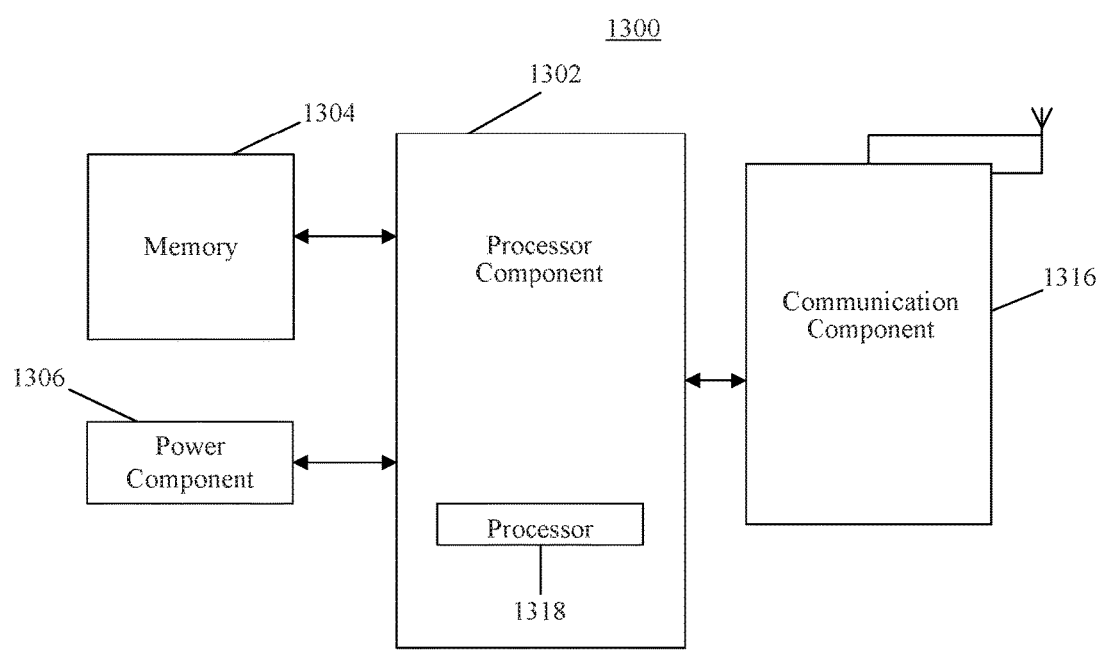
FIG. 13 is a block diagram of an apparatus for displaying a router setup interface according to an exemplary embodiment.

FIG. 13 is a block diagram of an apparatus 1300 for displaying a router setup interface according to an exemplary embodiment. For example, the apparatus 1300 may be the wireless router 140 in FIG. 1, and can be a router, a switch, or the like.

Referring to FIG. 13, the apparatus 1300 may include one or more of the following components: a processing component 1302, a memory 1304, a power component 1306, and a communication component 1316.

The processing component 1302 typically controls overall operations of the apparatus 1300, such as the operations associated with address resolution, data transmission and flow control. The processing component 1302 may include one or more processors 1318 to execute instructions to perform all or a part of the steps in the above-described methods. In addition, the processing component 1302 may include one or more modules which facilitate the interaction between the processing component 1302 and other components. For example, the processing component 1302 may include a multimedia module to facilitate the interaction between the multimedia component 1308 and the processing component 1302.

The memory 1304 is configured to store various types of data to support the operations of the apparatus 1300. Examples of such data include instructions for any application or method operated on the apparatus 1300, user data, and the like. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk. The memory 1304 further stores one or more modules which are configured to be executed by the one or more processors 1320, to perform all or a part of the steps in the methods shown in FIG. 5 or FIG. 6.

The power component 1306 provides power to various components of the apparatus 1300. The power component 1306 may include a power management system, one or more power supplies, and other components associated with the generation, management, and distribution of power in the apparatus 1300.

The communication component 1316 is configured to facilitate communications, wired or wirelessly, between the apparatus 1300 and other devices. The apparatus 1300 may establish a wireless network based on a communication standard, such as a WiFi network. In one exemplary embodiment, the communication component 1316 transmits a broadcast signal or broadcast associated information to the outside through a broadcast channel.

In exemplary embodiments, the apparatus 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer-readable storage medium including instructions, such as included in the memory 1304, executable by the processor 1318 in the apparatus 1300, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

Consistent with embodiments of the present disclosure, the apparatuses 800, 900, 1000, 1100, 1200, and 1300 for displaying a router setup interface explained above may determine whether the initialization setup of a wireless router is completed, based on the configuration parameters contained in the broadcast information transmitted from the wireless router. If the initialization setup of the wireless router is not completed, a terminal automatically establishes a connection with the wireless router to acquire the setup interface from the wireless router, and displays the setup interface, thereby freeing the user from the need to perform operations of creating connection and to manually input the device address, which makes the operation process complicated. The apparatuses may reduce user's involvement to set up a wireless router, thereby improving user experience.

With respect to the apparatuses in the above embodiments, the specific implementations of operations executed by various modules thereof have been in detail described in the embodiments illustrating the methods, which are not described herein any further.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method for displaying a router setup interface, the method being performed by a terminal and comprising:
   receiving broadcast information from a wireless router;
   acquiring configuration parameters contained in the broadcast information;
   determining, based on the configuration parameters, whether an initialization setup of the wireless router is completed;
   if it is determined that the initialization setup of the wireless router is not completed, establishing a connection with the wireless router;
   acquiring a setup interface of the wireless router through the connection; and
   displaying the setup interface,
   wherein the broadcast information contains a data block including Wi-Fi simple configuration information, and the acquiring configuration parameters contained in the broadcast information comprises:
      acquiring a Wi-Fi simple configuration state identification from the Wi-Fi simple configuration information in the data block, and
   wherein the determining, based on the configuration parameters, whether the initialization setup of the wireless router is completed comprises:
      reading an attribute value of the Wi-Fi simple configuration state identification;
      if the attribute value of the Wi-Fi simple configuration state identification is a first predetermined attribute value, determining that the initialization setup of the wireless router is not completed; and
      if the attribute value of the Wi-Fi simple configuration state identification is a second predetermined attribute value, determining that the initialization setup of the wireless router is completed.

2. The method according to claim 1, wherein
the first predetermined attribute value of the Wi-Fi simple configuration state identification is 0x01, and
the second predetermined attribute value of the Wi-Fi simple configuration state identification is 0x02.

3. The method according to claim 1, wherein prior to establishing the connection with the wireless router, the method further comprises:
displaying prompt information to allow a user to determine whether to select and set up the wireless router.

4. The method according to claim 3, wherein the establishing the connection with the wireless router comprises:
when detecting that the wireless router is selected, establishing the connection with the wireless router.

5. A method for displaying a router setup interface, the method being performed by a wireless router and comprising:
determining an initialization state of the wireless router;
setting, based on the initialization state, configuration parameters in broadcast information to be transmitted; and
transmitting the broadcast information including the configuration parameters, the broadcast information being used to instruct a terminal to:
establish a connection with the wireless router when the terminal determines, based on the configuration parameters, that an initialization setup of the wireless router is not completed,
acquire a setup interface of the wireless router through the connection, and
display the setup interface,
wherein the broadcast information contains a data block including Wi-Fi simple configuration information, and
the setting, based on the initialization state, configuration parameters in broadcast information to be transmitted comprises:
if the initialization state of the wireless router indicates that the initialization setup of the wireless router is not completed, setting an attribute value of a Wi-Fi simple configuration state identification in the data block to a first predetermined attribute value; and
if the initialization state of the wireless router indicates that the initialization setup of the wireless router is completed, setting the attribute value of a Wi-Fi simple configuration state identification in the data block to a second predetermined attribute value.

6. The method according to claim 5, wherein
the first predetermined attribute value of the Wi-Fi simple configuration state identification in the data block is 0x01; and
the second predetermined attribute value of the Wi-Fi simple configuration state identification in the data block is 0x02.

7. A terminal for displaying a router setup interface, comprising:
one or more processors; and
a memory,
wherein the one or more processors are configured to perform:
receiving broadcast information from a wireless router;
acquiring configuration parameters contained in the broadcast information;
determining, based on the configuration parameters, whether an initialization setup of a wireless router is completed;

if it is determined that the initialization setup of the wireless router is not completed, establishing a connection with the wireless router;
acquiring a setup interface of the wireless router through the connection; and
displaying the setup interface,
wherein the broadcast information contains a data block including Wi-Fi simple configuration information, and
the one or more processors are further configured to perform:
acquiring a Wi-Fi simple configuration state identification from the Wi-Fi simple configuration information in the data block,
reading an attribute value of the Wi-Fi simple configuration state identification;
if the attribute value of the Wi-Fi simple configuration state identification is a first predetermined attribute value, determining that the initialization setup of the wireless router is not completed; and
if the attribute value of the Wi-Fi simple configuration state identification is a second predetermined attribute value, determining that the initialization setup of the wireless router is completed.

8. The terminal according to claim 7, wherein
the first predetermined attribute value of the Wi-Fi simple configuration state identification is 0x01, and
the second predetermined attribute value of the Wi-Fi simple configuration state identification is 0x02.

9. The terminal according to claim 7, wherein prior to establishing the connection with the wireless router, the one or more processors are further configured to perform:
displaying prompt information to allow a user to determine whether to select and set up the wireless router.

10. The terminal according to claim 9, wherein the one or more processors are further configured to perform:
when detecting that the wireless router is selected, establishing the connection with the wireless router.

11. A router for displaying a router setup interface, comprising:
one or more processors; and
a memory,
wherein the one or more processors are configured to perform:
determining an initialization state of the wireless router;
setting, based on the initialization state, configuration parameters in broadcast information to be transmitted; and
transmitting the broadcast information including the configuration parameters, the broadcast information being used to instruct a terminal to:
establish a connection with the wireless router when the terminal determines, based on the configuration parameters, that an initialization setup of the wireless router is not completed,
acquire a setup interface of the wireless router through the connection, and
display the setup interface,
wherein the broadcast information contains a data block including Wi-Fi simple configuration information, and
the one or more processors are further configured to perform:
if the initialization state of the wireless router indicates that the initialization setup of the wireless router is not completed, setting an attribute value of a Wi-Fi simple configuration state identification in the data block to a first predetermined attribute value; and if the initialization state of the wireless router indicates that the initialization setup of the wireless router is completed, setting the attribute value of a Wi-Fi simple configuration state identification in the data block to a second predetermined attribute value.

12. The router according to claim 11, wherein
the first predetermined attribute value of the Wi-Fi simple configuration state identification in the data block is 0x01; and
the second predetermined attribute value of the Wi-Fi simple configuration state identification in the data block is 0x02.

13. A non-transitory computer-readable storage medium having stored therein instructions that, when executed by one or more processors of a terminal, cause the terminal to perform:
receiving broadcast information from a wireless router;
acquiring configuration parameters contained in the broadcast information;
determining, based on the configuration parameters, whether an initialization setup of the wireless router is completed;
if it is determined that the initialization setup of the wireless router is not completed, establishing a connection with the wireless router;
acquiring a setup interface of the wireless router through the connection; and
displaying the setup interface,
wherein the broadcast information contains a data block including Wi-Fi simple configuration information, and the instructions further causes the terminal to perform:
acquiring a Wi-Fi simple configuration state identification from the Wi-Fi simple configuration information in the data block,
reading an attribute value of the Wi-Fi simple configuration state identification;
if the attribute value of the Wi-Fi simple configuration state identification is a first predetermined attribute value, determining that the initialization setup of the wireless router is not completed; and
if the attribute value of the Wi-Fi simple configuration state identification is a second predetermined attribute value, determining that the initialization setup of the wireless router is completed.

14. A non-transitory computer-readable storage medium having stored therein instructions that, when executed by one or more processors of a wireless router, cause the wireless router to perform:
determining an initialization state of the wireless router;
setting, based on the initialization state, configuration parameters in broadcast information to be transmitted; and
transmitting the broadcast information including the configuration parameters, the broadcast information being used to instruct a terminal to:
establish a connection with the wireless router when the terminal determines, based on the configuration parameters, that an initialization setup of the wireless router is not completed,
acquire a setup interface of the wireless router through the connection, and
display the setup interface,
wherein the broadcast information contains a data block including Wi-Fi simple configuration information, and the one or more processors are further configured to perform:
if the initialization state of the wireless router indicates that the initialization setup of the wireless router is not completed, setting an attribute value of a Wi-Fi simple configuration state identification in the data block to a first predetermined attribute value; and
if the initialization state of the wireless router indicates that the initialization setup of the wireless router is completed, setting the attribute value of a Wi-Fi simple configuration state identification in the data block to a second predetermined attribute value.

* * * * *